United States Patent [19]
Wetzel et al.

[11] 4,045,214
[45] Aug. 30, 1977

[54] METHOD FOR PRODUCING STEEL

[75] Inventors: Rolf Wetzel, Heiligenhaus-Isenbugel; Dietrich Radke, Essen-Margaretenhohe, both of Germany

[73] Assignee: Fried. Krupp Gesellschaft mit beschrankter Haftung, Essen, Germany

[21] Appl. No.: 540,957

[22] Filed: Jan. 14, 1975

[30] Foreign Application Priority Data

Jan. 16, 1974 Germany .................... 2401909

[51] Int. Cl.² .......................... C21B 13/14
[52] U.S. Cl. ......................... 75/60; 75/38; 75/46
[58] Field of Search ............ 75/38, 40, 11, 26, 46, 75/59, 60

[56] References Cited
U.S. PATENT DOCUMENTS

| | | | |
|---|---|---|---|
| 2,612,444 | 9/1952 | Rummel | 75/40 |
| 2,750,277 | 6/1956 | Marshall | 75/40 |
| 2,919,983 | 1/1960 | Halley | 75/38 |
| 3,264,096 | 8/1966 | Agarwal et al. | 75/40 |
| 3,454,395 | 7/1969 | von Stroh et al. | 75/40 |
| 3,862,834 | 1/1975 | von Waclawiczek et al. | 75/11 |

Primary Examiner—M. J. Andrews
Attorney, Agent, or Firm—Spencer & Kaye

[57] ABSTRACT

A method for producing steel from fine-grained iron ores includes the step of preheating and partially reducing the fine-grained iron ores in a countercurrent heat exchanger. The preheated and partially reduced fine-grained iron ores are then reduced in a fluidized bed reactor to form sponge iron. The reduction in the fluidized bed reactor is effected with exhaust gases which consist substantially of carbon monoxide and which emanate from a melting vessel in which sponge iron is melted. The fine-grained sponge iron produced in the fluidized bed reactor is separated from the reduction gases which form during the reduction in the fluidized bed reactor. The separated fine-grained sponge iron is pneumatically transported into a carbon containing melt in the melting vessel. The transported sponge iron is melted and subjected to a final reduction in the metal melt with the carbon in the metal melt and with further carbonaceous material which is pneumatically introduced into the metal melt. The melt is refined with pure oxygen. The oxygen, carbonaceous material and sponge iron are introduced into the metal melt through at least one nozzle which is disposed below the level of the metal melt surface.

16 Claims, 1 Drawing Figure

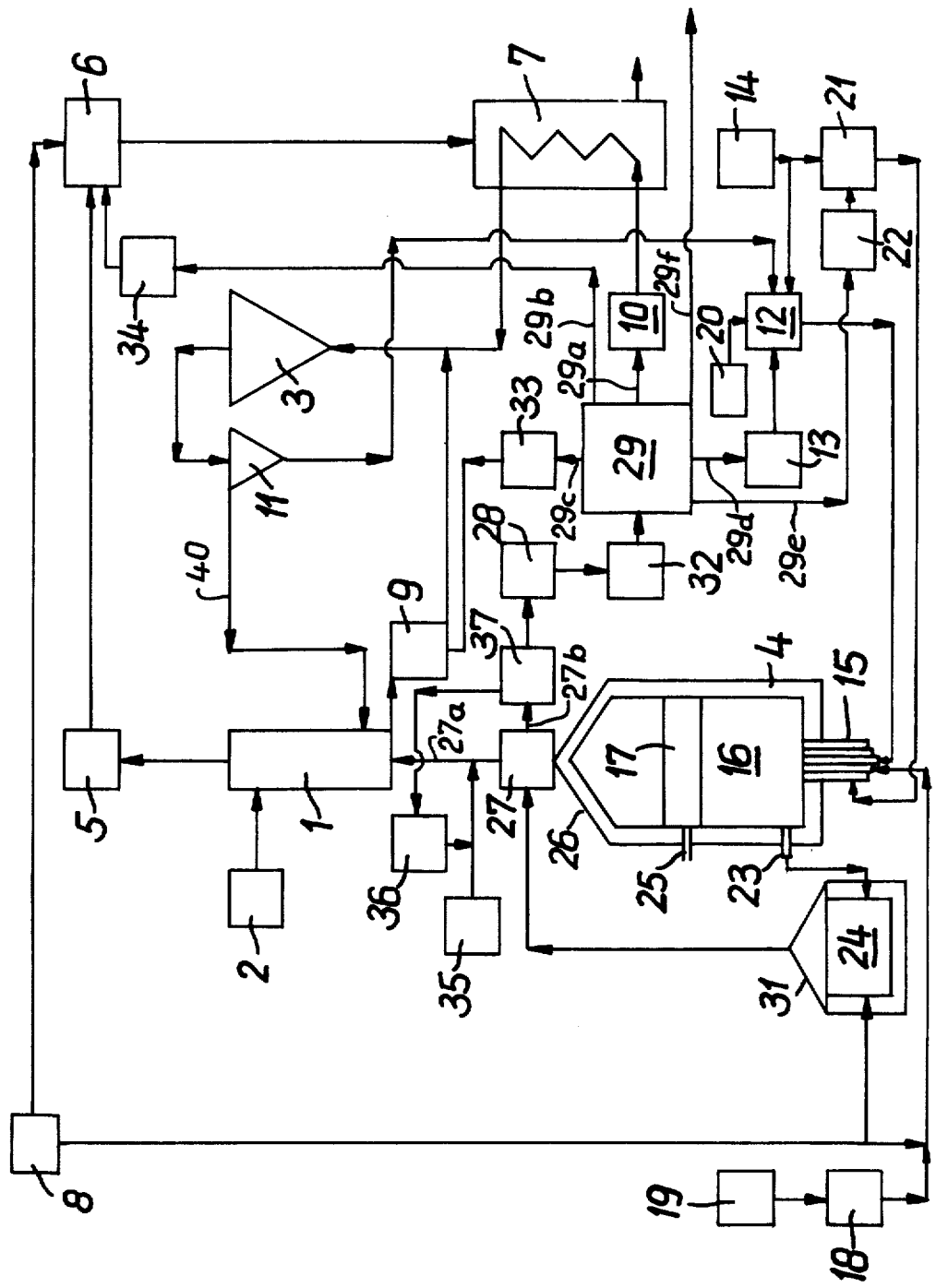

METHOD FOR PRODUCING STEEL

FIELD OF THE INVENTION

The present invention relates to a method for producing steel from fine-grained iron ores.

BACKGROUND OF THE INVENTION

It is known that sponge iron can be produced by reducing fine-grained iron ores in a fluidized bed reactor with gaseous reduction agents, such as, for example carbon monoxide and hydrogen. The metallic iron contained in the so-produced fine-grained sponge iron is easily reoxidized. Therefore, the fine-grained sponge iron must be protected against reoxidation before it is melted (which melting is usually a discontinuous process) by changing it into a solid form by means of so-called hot briquetting or by storing and transporting it in inert gas. Hot briquetting, as well as storage and transport in inert gas, produce technical difficulties and substantial costs. Further, reoxidation can never be completely prevented by either of these protective measures because such reoxidation also takes place, to a certain extent, at the surface of the sponge iron briquettes and the inert gases employed always have a slight oxygen content.

In order to be able to effect the melting of the sponge iron at a justifiable cost, the sponge iron must contain as large an amount as possible of metallic iron. The high degree of metallization of the sponge iron desired in the reduction of the ore produces high costs, however, and requires particularly effective protective measures to prevent reoxidation.

It is also known to melt sponge iron by adding electrical energy or combustion heat in a suitable apparatus. Natural gas, crude oil and coal can be used to produce the combustion heat. Suitable melting devices are hearth furnaces, (electric arc furnaces, Siemens-Martin furnaces), shaft furnaces (blast furnaces, cupola furnaces, electric low-shaft furnaces) and crucibles (oxygen refining converters) in which in addition to the melting process, alloying, final reduction and/or refining processes can also take place. Thus it is possible, for example, to melt sponge iron in a blast furnace and at the same time subject it to a final reduction, the end product being pig iron which is rich in carbon. When pig iron is refined in a converter, the carbon contained in the pig iron to an amount up to 4% is burned by the blown-in air or oxygen and the heat produced by this process can be utilized to melt the sponge iron. The capacity of the converter for sponge iron to be melted is undesirably limited, however, by the carbon content of the pig iron in the converter. Further, the nozzles with which the oxygen is introduced into the liquid pig iron are subject to heavy mechanical, thermal and chemical stresses which lead to malfunctions in the refining and melting processes. Many attempts have therefore been made to introduce larger quantities of heat into the converter by suitable measures and to reduce the stresses inherent in the process to which the oxygen injection devices are subjected. In one such prior art method, the metal bath in the converter has been heated by an oil heating system operated with oxygen, but this method has not found acceptance because the capacity of the converter for sponge iron to be melted could not be substantially increased in view of economical considerations due to insufficient heat transfer from the combustion gases to the metal bath.

It is also the custom to introduce the sponge iron to be melted into the converter in charges and to remove the molten steel present after the refining process in a discontinuous manner so that longer starting and dead times are encountered for the converter.

SUMMARY OF THE INVENTION

It is a primary object of the present invention to produce steel continuously and economically by reducing fine-grained iron ores to sponge iron and melting the sponge iron and refining the melt.

Additional objects and advantages of the invention will be set forth in part in the description which follows, and in part will be obvious from the description, or may be learned by practice of the invention. The objects and advantages are realized and attained by means of the steps and combination particularly pointed out in the appended claims.

To achieve the foregoing objects and in accordance with its purpose, this invention provides a process for producing steel from fine-grained iron ore which comprises the steps of: preheating and partially reducing the fine-grained iron ores in a countercurrent heat exchanger; reducing the preheated and partially reduced fine-grained iron ores to fine-grained sponge iron in a fluidized bed reactor with exhaust gases which consist essentially of carbon monoxide and which emanate from a melting vessel in which sponge iron is melted; separating the fine-grained sponge iron formed in the fluidized bed reactor from reduction gas which forms during the reduction in the fluidized bed reactor and pneumatically conveying the separated sponge iron into a carbon-containing metal melt in the melting vessel;- melting and finally reducing the sponge iron in the metal melt with the carbon present in the metal melt and with further carbonaceous material which is pneumatically introduced into the metal melt; refining the metal melt with pure oxygen; and introducing the oxygen, the carbonaceous material and the sponge iron into the metal melt through at least one nozzle disposed below the surface of the metal melt.

The process of the present invention enables large amounts of sponge iron to be melted and permits continuous removal and addition of materials to the metal melt. The oxygen stream introduced into the metal melt can contain caustic lime and the sponge iron introduced into the metal melt can be partly replaced with scrap. The oxygen and the fine-grained sponge iron and carbonaceous material required for the melting process preferably are introduced into the metal melt in immediate proximity to one another. Generally, the oxygen stream is introduced into the metal melt through an opening in a nozzle and the fine-grained sponge iron and carbonaceous material are introduced into the metal melt through at least one further opening in a nozzle. The oxygen stream can be introduced via a first opening in a nozzle and the fine-grained sponge iron and carbonaceous material can be introduced via the same nozzle having at least two additional openings, one for the fine-grained sponge iron and one for the carbonaceous material. More than one stream of oxygen can be introduced into the melting vessel and for each such stream there are corresponding streams for introducing carbonaceous material and fine-grained sponge iron.

In order to be able to introduce the carbonaceous materials into the melting vessel through nozzle openings below the surface of the melt, the carbonaceous material is suspended in a suitable carrier gas, which preferably is a portion of the exhaust gas from the melting vessel. The suspension in the exhaust gas of the substances required for the melting process enables molten iron and slag to be removed from the melting vessel and the starting material of oxygen, lime, carbonaceous material, fine-grained sponge iron, and scrap to be introduced into the melting vessel in a continuous manner.

It is to be understood that both the foregoing general description and the following detailed descriptions are exemplary and explanatory, but are not restrictive of the invention.

BRIEF DESCRIPTION OF THE DRAWINGS

The accompanying drawing illustrates an example of a preferred embodiment of the invention and together with the description serves to explain the principles of the invention.

The sole FIGURE of the drawing provides a schematic representation of an apparatus that can be used in accordance with the teachings of this invention to practice the process of this invention.

DETAILED DESCRIPTION OF THE INVENTION

The process steps which comprise the process of the present invention are attuned to one another so that the process is continuous.

In the practice of the present invention, fine-grained iron ores are preheated and partially reduced in a countercurrent heat exchanger. The grain size of the fine-grained ore can be from finest e.g. less than $1\mu$ to 3 mm and preferably is from finest e.g. less than $1\mu$ to 0.5 mm. The preheating and partial reduction of the fine-grained iron ores preferably is effected with exhaust gases developed in other parts of the process. In one other part of the process the preheated and partially reduced fine-grained ore is reduced to sponge iron in a fluidized bed reactor and during this operation a reduction exhaust gas which contains essentially $CO_2$ is produced. In still another part of the process, sponge iron is melted in a melting vessel where a metal melt is being refined and this melting and refining operation produces an exhaust gas which essentially contains carbon monoxide. The sponge iron being melted in the melting vessel has a grain size range from less than $1\mu$ to 3 mm. The exhaust gas from the reduction of the fine-grained iron ore to sponge iron and a portion of the exhaust gas from the melting of the sponge iron and refining of the metal melt are the gases that are preferably used to effect the preheating and partial reduction of the fine-grained iron ore particles. The use of these exhaust gases to preheat and partially reduce the fine-grained iron ores has a favorable effect on the overall energy balance of the process. In addition to using a portion of the exhaust gas from the melting of the sponge iron and refining of the melt as the gas to effect preheating and partial reduction of the fine-grained iron ores, orthe portions of this exhaust gas can be used in various other parts of the process as explained in greater detail hereafter.

The quantities of exhaust gases used in the preheating and prereduction step are chosen so that the fine-grained iron ores are heated in the countercurrent heat exchanger to a temperature of 500° to 850° C. At these temperatures the fine-grained iron ores are subjected to a prereduction because the exhaust gases developed during the refining of the metal melt contain almost exclusively carbon monoxide. Generally, the amount of exhaust gas used in the preheating and partial reduction of the fine-grained iron ores can be from 60 to 700 N1 per kg of fine-grained iron ore and the volume ratio of exhaust gas from the fluidized bed reactor to that from the melting vessel can vary from 0.01 to 20.

In order to increase the economical operation of the process of the present invention it is possible to replace the fine-grained iron ore in part by fine-grained iron-oxide-containing waste material, such as, for example, blast furnace dust, scale from the rollers, and dust from the steel works. When using such waste material, the amount of waste material will replace from less than 1 to 100% of the fine-grained iron ore.

After the fine-grained iron ores are preheated and reduced, the preheated and prereduced, fine-grained iron ores are led to a fluidized bed reactor where they are subjected to a direct reduction. A portion of the exhaust gas produced in the melting vessel during the melting of the sponge iron and refining of the metal melt is used as the reducing agent in the fluidized bed reactor. The exhaust gas introduced into the fluidized bed reactor must be heated because the reduction of the fine-grained iron ores into sponge iron takes place at temperatures between 500° and 850° C. Accordingly, before being sent to the fluidized bed reactor, the exhaust gas preferably is heated in a heat exchanger. At temperatures of 500° to 850° C the fine-grained iron ore is reduced in the fluidized bed reactor to such an extent that the degree of metallization of the sponge iron is between 40 and 96%. The degree of metallization which is best suited for the process depends on the size of the installation, on the quantities of further materials to be melted which might possibly be added to the melting vessel and on the possible removal of exhaust gas from the melting vessel for utilization somewhere else in view of its high carbon monoxide content. In order to attain a higher degree of metallization, it is particularly advisable to reduce the fine-grained iron ores to sponge iron in one or a plurality of series-connected bottomless fluidized bed reactors.

During production of the sponge iron in the fluidized bed reactor, reduction exhaust gases are formed. The sponge iron produced in the fluidized bed reactor is separated from the reduction exhaust gas, preferably in one or more cyclone separators. The sponge iron is then led to a melting vessel where it is melted and final reduction occurs.

In accordance with the invention, the separated sponge iron is pneumatically transported into a carbon containing melt in the melting vessel. This transportation preferably is effected by using part of the exhaust gas which is formed in the melting vessel. As previously mentioned, this exhaust gas consists essentially of carbon monoxide and by using it to convey the sponge iron to the melt, reoxidation of the sponge iron is prevented during transportation to the melt.

The sponge iron that is introduced into the metal melt is melted in the melting vessel and is finally reduced with the carbon in the metal melt and with further carbonaceous material which is introduced into the metal melt.

A stream of oxygen also is introduced into the metal melt in the melting vessel to bring about combustion of carbon and carbonaceous material and effect refining of the metal melt. The oxygen stream can have suspended in it caustic lime (CaO) in finely divided form (lime dust). The addition of lime is almost always necessary in order to bind the phosphorus, silicon and sulfer impurities in the melt. The fine lime dust generally has a particle size ranging from finest e.g. less than 1μ to about 3 mm. The oxygen stream in which fine caustic lime may be suspended is introduced into the metal melt below the melt surface. The oxygen stream can be introduced in accordance with known oxygen blowing processes in which oxygen is partially blown into the metal bath with an oxygen blowing lance. Generally, the oxygen stream contains pure oxygen as the only gas in the oxygen stream and is introduced at a rate of 0.5 $Nm^3$/min. × ton to 6$Nm^3$/minute × ton.

The carbonaceous material that is added to the metal melt preferably is in the form of solid, carbonaceous dust and is added to the metal melt below the surface of the melt. The carbonaceous dust is a carbon containing material in a finely divided state and can, for example, be solid carbon particles or can be in the form of coal dust. Preferably, the solid carbonaceous dust is coal dust. In general, all types of pulverized coal, for example, brown coal, hard coal and high-volatile coal can be used in the process as well as pulverized coke. It is also possible to use solid residues from petroleum processing which can be made into dust-like products by the addition of suitable materials, such as for example, alumina. Moreover, it is possible to use fine-grained calcium carbide as the solid carbonaceous dust.

The solid, carbonaceous dust particles are pneumatically carried to the metal bath by a carrier gas. The solid carbonaceous dust particles should be substantially free of any water adhering to them before they are suspended in the carrier gas and generally any well known technique can be used to insure that the carbonaceous particles are free of water. when the carbonaceous dust particles are prepared from coal, the coal can be thoroughly dried by steam before it is ground into coal dust.

The carbonaceous dust is combusted with oxygen in the melting vessel in an exothermic reaction which supplies heat to the melting vessel and produces an exhaust gas consisting essentially of pure carbon monoxide. The heat generated from this combustion is used to melt the sponge iron that is added to the metal melt. The solid carbonaceous dust effects final reduction of the sponge iron and maintains the temperature of the metal melt.

In the process of the present invention, between 0.7 and 1.3 $Nm^3$ of oxygen are used to burn 1 kg of carbon into carbon monoxide. This reaction produces 2469 Kcal, per kg of carbon, of which about 1069 Kcal are removed from the melting vessel by the carbon monoxide exhaust gas leaving the melting vessel so that 1400 Kcal remain in the melting vessel and can be utilized for the melting process. Since the carbon content of the carbonaceous material varies with different materials and the sponge iron that is to be melted in the bath often contains different amounts of iron, it is necessary to vary the quantity of carbonaceous material accordingly. The amount of carbonaceous material added to the metal bath can range, for example, from 100 kg/t of sponge iron to 900 kg/t of sponge iron and can have a size range from less than 1μ to 3 mm. Optimum final reduction of the sponge iron is attained if the carbon content of the metal melt in which the sponge iron is being melted does not drop below 0.1% during the refining with pure oxygen. This metal melt has only the quality of a preliminary steel and is set to the desired carbon content in a further metallurgical vessel by blowing with oxygen.

The carbonaceous material preferably is introduced into the melting vessel by a carrier gas consisting of carbon monoxide. Although any other gas, such as argon or nitrogen, which does not react, or reacts only to a slight degree, with the substances suspended in the carrier gas and which has no negative effect on the composition of the molten metal and the exhaust gases can be used. It is particularly economical for the process to use a part of the exhaust gas of the melting process as the gas for pneumatically transporting the carbonaceous material to the melting vessel. As previously mentioned, this exhaust gas contains almost nothing but carbon monoxide and can be introduced into circulation without any complicated dust removal processes. In addition to pneumatically transporting the starting solid materials of sponge iron and carbonaceous material, the exhaust gas introduced into the melting vessel acts together with the combustion gases produced in the melting vessel to effect an intensive mixing of the metal melt and thus produces uniform temperature and concentration conditions in the melting vessel. Thus, in preferred embodiments of the invention, both the fine-grained sponge iron and the carbonaceous material are suspended in portions of the exhaust gas which develops in the melting vessel during melting the starting materials and during refining of the metal melt.

For the pneumatic conveyance of the carbonaceous dust and of the fine-grained sponge iron, generally 3 to 25 Nl carrier gas is required per kg of solids. The particle size of the solids in the exhaust gas should be at most 1/10 of the narrowest conveying cross-section and preferably should be about 20μ. The exhaust gas and solids therein are transported by gas line and can be introduced into the melting vessel through one or more nozzles. The pressure with which the starting materials are introduced into the melting vessel is adapted to the respective dimensions of the vessel, its fill level and the number of nozzles. The pressure can range, for example, from 3 bar to 40 bar and the number of nozzles can be from 1 to 30.

The starting materials of oxygen, fine-grained sponge iron and carbonaceous material can be introduced into the melting vessel by a number of techniques. In a preferred embodiment of the invention, the oxygen, the carbonaceous material, the fine-grained sponge iron, and further additives which one may want to add to the metal melt, are introduced into the metal melt through one or a plurality of multiple jack nozzles. In order to prevent iron oxidation during the refining process and to maintain the carbon content of the metal melt having a preliminary steel quality so that the final reduction of the sponge iron can take place the various substances preferably are introduced into the metal melt through the individual, concentrically disposed pipes of a multijacket nozzle. Thus, a multijacket nozzle can be provided having an inner pipe, an outer pipe and a center pipe between the inner and outer pipes, with the fine-grained sponge iron being introduced through the innermost pipe; oxygen, to which fine-grained lime and/or further additives may have been added being introduced through the center pipe; and carbonaceous material being introduced through the outermost pipe.

The carbonaceous material that is added to the melting vessel is added in a gas stream separate from the stream of fine-grained sponge iron. It is also possible, however, to add carbonaceous material to the fine-grained sponge iron gas stream so that the carbonaceous material is introduced into the melting vessel in two gas streams, one being the fine-grained sponge iron gas stream and the other being the gas stream containing carbonaceous material without fine-grained sponge iron. The amount of carbonaceous material in the fine-grained sponge iron gas stream can be from about less than 1 to 60% of the fine-grained sponge iron in the stream.

In addition to introducing the fine-grained sponge iron into the melting vessel, other materials such as scrap and ore such as iron ore can also be introduced into the melting vessel. The adding of ore and scrap to the melting vessel increases the amounts of oxygen and carbonaceous material that must be added to the metal melt to bring about the melting in the melting vessel and also increases the amount of exhaust gas that is formed in the melting vessel.

The metal melt can be started up by adding molten pig iron to the melting vessel. During operation, the fine-grained sponge iron that is added to the metal melt can comprise from less than 1 kg/minute × ton of the metal melt to 60 kg/minute × ton of the metal melt. Scrap can comprise less than 1 kg/minute × ton of the metal melt to 60 kg/minute × ton of the metal melt of the metal melt and ore can comprise 0 to 20 percent of the metal melt. The ore that can be added to the metal melt can be iron ore, manganese ore, nickel ore, or cobalt ore, and this ore is refined in the metal melt.

The melting vessel produces a liquid preliminary steel and this steel can be continuously removed from the melting vessel and introduced into a refining converter where further or final refining takes place. In the refining converter, the preliminary steel can be blown with oxygen to obtain a desired required final carbon content.

The process of the present invention provides readily available means for controlling and regulating the process parameters and conditions. Thus, for example it is possible to vary the quantity and or composition of the reduction gas used to reduce the preheated and partially reduced fine-grained iron ore to sponge iron in the fluidized bed reactor. By changing the composition and quantity of the reduction gas, the degree of metallization of the resulting sponge iron is changed. The composition of the reduction gas can be changed by changing the volume ratio of exhaust gas to that from the melting vessel. Further, by adding ore and/or scrap into the melting vessel, the quantity of carbonaceous material and oxygen that has to be added to the melting vessel is increased and there is an increase in the amount of exhaust gas formed in the melting vessel.

Further since the process of the present invention is continuous and since all starting materials except for the scarp are pneumatically fed into the melting vessel, the quantities of carbonaceous material, of scrap, and of sponge iron can be varied in mutual dependence upon one another in order to regulate the metal melt temperature and the carbon content of the metal melt. If, for example, the oxygen content and the quantity of carbonaceous material are increased, the input of sponge iron can be increased with the quantity of scrap remaining the same without there occurring a change in the path temperature. This control of the quantities of the streams can also be used to set the carbon content in the metal bath so that it is particularly favorable for melting solid metal additives, such as, for example, sponge iron or scrap, or so that certain metallurgical reactions will be enhanced, for example, the removal of sulfur for instance by adding lime.

The present invention for producing steel provides a number of advantages as compared to the prior art. The pneumatic introduction of the starting materials enables the melting process to take place continuously and makes it easy to regulate it. The continuous operation of the process shortens the starting and dead times for the individual components in the process and avoids intermediate storage and reoxidation of the sponge iron.

The use of solid carbonaceous material, and particularly coal dust, reduces the expenditures for the melting process and results in an economical and efficient operation. Further, the use of solid carbonaceous dust increases the melting output of the converter and the operational safety of the exhaust gas system.

In addition, the carbon monoxide exhaust gas produced during the melting process is a valuable product which is particularly suited for further use in other parts of the process such as a carrier gas for transporting the starting materials of fine-grained sponge iron and solid carbonaceous material into the melting vessel and brings about a thorough mixing of the metal melt and serves as a protective gas for the metal melt. Further, the exhaust gas of the melting vessel can be used to bring about preheating and partial reduction of the fined-grained iron ore and can be used as the reducing gas for effecting reduction of the fine-grained iron ore to sponge iron in the fluidized bed reactor. The exhaust gas continuously develops during the melting process and consists of 90 to 99% carbon monoxide. The quantity of exhaust gas which is not used in other parts of the process can be used as a heating gas or as a raw material for chemical synthesis of, for example, organic compositions. Generally, about 50 to 100% of the exhaust gas is used in the other parts of the process and the remainder is available for chemical synthesis or heating purposes.

The process of the present invention enables maximum utilization of the raw materials. The use of coal dust, the optimum utilization of the heat contained in the exhaust gases and use of the carbon monoxide contained in the exhaust gases results in an economical and efficient operation. Moreover, since the heat required to melt the sponge iron is produced within the melting vessel this heat is utilized to its maximum. The process of the present invention is further distinguished by easy controllability and the possibility of using any type of coal.

The process of the present invention enables the carbon content of the metal bath to be controlled by regulating the oxygen and carbon quantities which are added to the metal bath. The carbon content can be controlled to be in an optimum range for a particular purpose during the melting of the sponge iron. For example, the carbon content can be controlled to insure that the dissolution of metallic additives is particularly effective or the removal of sulfur is particularly enhanced.

One embodiment of the present invention is illustrated in the drawing. Fine-grained iron ore of a grain size of from finest to 3mm, preferably finest to 0.5 mm, from a supply bunker 2 is introduced at the top of a first countercurrent heat exchanger 1. The optimum grain size depends, inter alia, on the size of the production assembly. The grain size decreases with the size of the system.

At the bottom of countercurrent heat exchanger 1, there is introduced still hot exhaust gas from a fluidized bed reactor 3 via line 40 and part of the exhaust gas from a melting vessel 4. The exhaust from melting vessel 4 is divided into two partial streams 27a and 27b by an exhaust gas distributor 27. One partial exhaust gas stream 27a flows into countercurrent heat exchanger 1 and the second partial exhaust gas stream flows into a countercurrent heat exchanger 37. Before stream 27a reaches countercurrent heat exchanger 1, carbon dust from a supply bunker 35 and hot steam from a steam distributor 36 are added to exhaust gas stream 27a. The hot steam added to exhaust gas stream 27a from steam distributor 36 is produced in countercurrent heat exchanger 37 from the second partial exhaust gas stream 27b of the exhaust gas from melting vessel 4. After leaving counercurrent heat exchanger 37, the second partial exhaust gas stream 27b is conducted to a dust remover 28. After removal of the dust, the second partial exhaust gas stream 27b is brought to required operating pressure in a compressor 32 and is stored in a pressurized reservoir tank 29. The required operating pressure lies between 1 and 40 atmospheres gauge depending on the size of the system. The exhaust gas in pressure reservoir tank 29 is fed from there via pressure reducers to various locations where it is to be used.

The exhaust gas from fluidized bed reactor 3 consists mainly of carbon dioxide while the exhaust gas from melting vessel 4 is almost exclusively carbon monoxide. Exhaust gas leaves countercurrent heat exchanger 1 and this exhaust gas has its dust removed in dust remover 5, is then burnt in a combustion chamber 6 with oxygen from an oxygen supply tank 8 and thereafter is fed to a heat exchanger 7 from where it can be sent to further utilization or discharged into the atmosphere. The cleaned and further burnt exhaust gas from countercurrent heat exchanger 1 which enters heat exchanger 7 consists almost quantitatively of carbon dioxide. If necessary for instance, when the heat available from burning the exhaust gas from heat exchanger 1 is not sufficient, exhaust gas from vessel 29 which is rich in carbon monoxide may be introduced into combustion chamber 6 via line 29b and pressure reducer 34.

The preheated, prereduced, fine-grained iron ore leaving heat exchanger 1 is transported to a valve controlled chamber 9 where it is mixed with an exhaust gas stream 29c which is a small part of the exhaust gas from vessel 29. Exhaust gas stream 29c is brought to a required operating pressure in a pressure reducer 33 before it enters chamber 9 and serves as a carrier gas for transporting the preheated, prereduced, fine-grained iron ore to fluidized bed reactor 3. An exhaust gas stream 29a from reservoir 29 is used for the reduction of the ores in fluidized bed reactor 3, but before being introduced into fluidized bed reactor 3, exhaust gas streams 29a is first brought to the required pressure in pressure reducer 10 and is then heated in a heat exchanger 7 so that the heat content of the gas is sufficient to cover the heat requirement for the endothermal reduction of the ores. The temperatures in fluidized bed reactor 3 is between 500° and 850° C and the degree of metallization of the sponge iron brought about in fluidized bed reactor 3 is between 40 and 95%. Fluidized bed reactor 3 has no bottom and has a conical shape. During reduction in fluidized bed reactor 3, reduction exhaust gases are produced. The sponge iron is separated from the reduction exhaust gas in cyclone 11 from where the reduction exhaust gas is fed via line 40 to countercurrent heat exchanger 1. In order to be better able to effect a direct reduction of the iron ore it is often advantageous for the reduction process to take place in a plurality of series-connected fluidized bed reactors 3 with series-connected cyclones 11.

The sponge iron produced in cyclone 11 is transported to a valve controlled chamber 12 and mixed in chamber 12 with an exhaust gas stream 29d which is part of the exhaust gas from pressurized reservoir tank 29. Exhaust gas stream 29d is brought to a required carrier gas pressure in a pressure reducer 13 before it enters chamber 12 and serves as a carrier gas for transporting the sponge iron to melting vessel 4. In chamber 12, coal dust from storage bunker 14 is mixed with the sponge iron. The coal dust has a grain size of from finest to 3 mm. Also, fine-grained iron ore from a bunker 20 may be mixed with the sponge iron in chamber 12. The sponge iron in chamber 12 which is suspended in carbon monoxide containing exhaust gas and mixed with coal dust is passed into a metal melt 16 in melting vessel 4 through the innermost pipe of a jacket nozzle 15 which is below the surface of the metal melt. A layer 17 of slag floats on metal melt 16.

The melting vessle 4 serves as the melting and final reduction and refining vessel.

Multiple jacket nozzle 15 contains an inner pipe, an outer pipe and a center pipe between the inner and outer pipes. Through the center pipe of multiple jacket nozzle 15 oxygen from oxygen tank 8 is blown into melting vessel 4. Fine-grained lime from a reservoir 19 and possibly other additives are mixed with the oxygen entering jacket nozzle 15 via a dosaging device 18.

Coal dust is added to melting vessel 4 through the outermost pipe of jacket nozzle 15. This coal dust is obtained from reservoir 14 and before it is added to melting vessel 4 it is mixed in a valve controlled chamber 21 with an exhaust 9 has stream 29e which is part of the exhaust gas from reservoir tank 29. Exhaust gas stream 29e is brought to a required operating pressure in pressure reducer 22 before its enters chamber 21 and serves as a carrier gas for transporting the coal dust to melting vessel 4. Melting vessel 4 is provided with one or a plurality of multijacket nozzles 15 which are disposed below the level of the metal bath surface so that the introduction of sponge iron, oxygen and carbonaceous material can take place at one or more points in the melting vessel.

Metal bath 16 has a temperature of 1200° to 16000° C and a carbon content of more than 0.1%

Liquid preliminary steel is taken from an outlet 23 of melting vessel 4 and is fed to a refining converter 24 where the preliminary steel is blown with oxygen from oxygen tank 8 to obtain a desired or required final carbon content. The slag present in melting vessel 4, which consists of additives, mineral components of the sponge iron and of the coal, as well as of metal oxides, is discharged from melting vessel 4 through an outlet 25. The exhaust gases formed in melting vessel 4 are almost quantitatively carbon monoxide and are transported from a gas-tight cover 26 into exhaust gas distributor 27. Exhaust gas from melting vessel 4, which does not serve as a reduction or carrier gas, is discharged from pressurized reservoir tank 29 for further utilization via line 29f. The exhaust gas from the refining converter 24, which gas consists almost exclusively of carbon monoxide, is fed through the almost completely gas-tight cover 31 to exhaust gas distributor 27 and mixed with the stream of exhaust gas from melting vessel 4. In order to start up melting vessel 4, liquid pig iron is furnished in pans or is premelted in a smaller melting oven.

The invention is explained in more detail by a specific example of its embodiment: A pilot converter was used to produce steel applying the process covered by the invention. For this purpose, the converter was charged with hot metal having a temperature of about 1400° C. The analysis of the hot metal was: carbon 4.1%; silicon 0.6%; manganese 0.7%; phosphorous 0.16% sulphur 0.04%. In the middle of the bottom of the pilot converter there was a tuyere so designed that a stream of oxygen could flow through its center hole, while pulverized solids carried in a stream of carbon monoxide could pass through its ring-shaped space around the center hole so as to form a jacket-like envelope around the central stream of oxygen. During hot metal charging into the converter, the tuyere was above the metal bath level and kept clear by a blast of nitrogen. Before turning the converter to its vertical position, the oxygen valve was opened to admit oxygen to the center hole of the tuyere, after which the feeding of pulverized coal was started by a rotary positive-air-lock feeder. With the converter in its vertical position, the pressure upstream of the pulverized coal tuyere was about 4 bar and the pressure upstream of the oxygen tuyere about 20 bar. The oxygen flow rate was adjusted to about 6 m³/min.

And the pulverized coal feed rate averaged 360 kg/hr. The size range of the pulverized coal was between 0.1 and 0.5 micron. The temperature of the metal bath was continuously measured using a built-in temperature measuring device. The feeding of pulverized coal and oxygen was continued until the metal bath reached a temperature of 1500° C. At this stage, small-size sponge iron was admixed to the pulverized coal stream by means of a second rotary positive-air-lock feeder at a feed rate of 600 kg/hr. The sponge iron had a size range of between 30 and 150 microns and contained about 75% metallic iron. The pressure upstream of the tuyere rose to about 6 kg/cm² gauge. The temperature of the metal bath was kept constant at 1500° C by controlling the feed rate of the admixed sponge iron. During the first phase of the blow, the carbon content of the metal bath decreased slowly to 1.5%. The carbon content was checked at intervals of approximately 30 minutes, with the samples being taken without interrupting the blow. After about 1 hour, when the carbon content in the metal bath was down at 1.5%, the flow of carbon and oxygen was stoichiometrically adjusted on the basis of the oxygen in the ponge iron by increasing the pulverized coal feed rate to 410 kg/hr. In the course of further sponge iron melt-down, the carbon content was maintained at this value by increasing or decreasing the pulverized coal feed rate.

A waste gas hood was mounted air-tight on the converter to prevent waste gas from escaping to the side. Connected to the waste-gas exhaust duct was a counterflow heat exchanger for small-size solids, a type which is also used in the cement industry. The waste gas removed from the converter at a rate of about 630 m³NPT/hr consisted primarily of carbon monoxide, its composition averaging 96% carbon monoxide and 3% carbon dioxide. In the course of sponge-iron feeding into the converter, this carbon dioxide content decreased to about 2%. The waste-gas temperature measured slightly above the converter mouth was about 1450° C. Owing to the heat exchange between the gas and the water-cooled hood, this temperature decreased to about 1300° C by the time the waste gas reached the inlet of the counterflow heat exchanger. The small-size ore passed through the heat exchanger countercurrent to the gas flow had a size range of between 30 and 150 microns. The product obtained from the heat exchanger was small-size sponge iron containing about 75% metallic iron which was discharged at a temperature of between 700° and 800° C and at a rate of 600 kg/hr. The sponge iron leaving the heat exchanger passed through a rotary positive-air-lock feeder into a pneumatic conveyor which carried the sponge iron in a natural gas stream to the rotary positive-air-lock feeder whence it was admixed at a controlled rate to the pulverized coal stream blown into the converter. The molten metal can be tapped from the converter when needed or at certain intervals, the slag formed by the gangue of the sponge iron and the coal ash being tapped together with the molten metal. After this slag has been separated, the molten metal may be treated in some other refining unit. The exit gas from the counterflow heat exchanger contained about 50 to 70% carbon monoxide and 30 to 50% carbon dioxide.

It will be understood that the above description of the present invention is susceptible to various modifications, changes and adaptations, and the same are intended to be comprehended within the meaning and range of equivalents of the appended claims.

We claim:

1. Method for producing steel from fine-grained iron ores, comprising the steps of:
  a. preheating and partially reducing the fine-grained iron ores in a countercurrent heat exchanger;
  b. reducing the preheated and partially reduced fine-grained iron ores to fine-grained sponge iron in a fluidized bed reactor with exhaust gas which consists essentially of carbon monoxide and which emanates from a melting vessel in which sponge iron is melted;
  c. separating the fine-grained sponge iron formed in the fluidized bed reactor from reduction gas which forms during the reduction in the fluidized bed reactor and pneumatically transporting the separated sponge iron into a carbon containing metal melt of iron in the melting vessel;
  d. melting and finally reducing the sponge iron in the metal with the carbon in the metal melt and with further carbonaceous material which is pneumatically introduced into the metal melt;
  e. refining the metal melt with pure oxygen; and
  f. introducing the oxygen, the carbonaceous material, and the sponge iron into the metal melt through at least one nozzle which is disposed below the surface of the metal melt, said oxygen, fine-grained sponge iron and carbonaceous material being introduced into the metal in immediate proximity to one another.

2. Method as defined in claim 1 wherein the exhaust gases from the fluidized bed reactor and part of the exhaust gases developed during refining of the metal melt are used to preheat and partially reduce the fine-grained iron ores in the countercurrent heat exchanger.

3. Method as defined in claim 1 wherein the fine-grained iron ores are preheated in the countercurrent heat exchanger in step (a) to a temperature of from 500° to 850° C.

4. Method as defined in claim 1 wherein the reduction of the fine-grained iron ores in the fluidized bed reactor takes place at a temperature of from 500° to 850° C.

5. Method as defined in claim 1 wherein the degree of metallization of the sponge iron leaving the fluidized bed reactor is between 40 and 95%.

6. Method as defined in claim 1 wherein excess exhaust gas from the melting process is collected.

7. Method as defined in claim 1 wherein the reduction of the fine-grained iron ores takes place in a plurality of series connected fluidized bed reactors.

8. Method as defined in claim 1 wherein part of the exhaust gas developed during the melting and refining that occures in the melting vessel is used to pneumatically transport the sponge iron and the carbonaceous material into the metal melt.

9. Method as defined in claim 1 wherein the carbonaceous material is a solid, fine-grained, carbonaceous material.

10. Method as defined in claim 9 wherein the solid, fine-grained carbonaceous material is coal dust.

11. Method as defined in claim 1 wherein during refining with pure oxygen the carbon content of the metal melt in which the sponge iron is being melted does not drop below 0.1%.

12. Method as defined in claim 1 wherein at least one multiple jacket nozzle is used to introduce the oxygen, the carbonaceous material and the sponge iron into the metal melt.

13. Method as defined in claim 12 wherein the multiple jacket nozzle contains an inner pipe, an outer pipe, and a center pipe between the inner and outer pipes and the sponge iron is introduced through the innermost pipe, oxygen is introduced through the center pipe and carbonaceous material is introduced through the outermost pipe.

14. Method as defined in claim 1 wherein the fine-grained iron ore is partially replaced by fine-grained iron oxide containing waste materials.

15. Method as defined in claim 1 wherein the process is controlled by changing at least one of the following paremeters:
  a. a change in the composition of the reduction gas;
  b. a change in the quantity of the reduction gas;
  c. addition of ore into the melting vessel;
  d. addition of scrap into the melting vessel.

16. A method as defined in claim 1 wherein the metal melt comprises pig iron.

* * * * *